United States Patent [19]

White et al.

[11] Patent Number: 5,259,862
[45] Date of Patent: Nov. 9, 1993

[54] CONTINUOUS PRODUCTION OF GRANULAR OR POWDER TI, ZR AND HF OR THEIR ALLOY PRODUCTS

[75] Inventors: Jack C. White; Laurance L. Oden, both of Albany, Oreg.

[73] Assignee: The United States of America as represented by the Secretary of the Interior, Washington, D.C.

[21] Appl. No.: 956,235

[22] Filed: Oct. 5, 1992

[51] Int. Cl.⁵ .................................................. C22B 34/10
[52] U.S. Cl. .................................... 75/363; 75/368; 75/369; 75/617
[58] Field of Search ................ 75/343, 363, 367, 368, 75/369, 371, 616-620

[56] References Cited

U.S. PATENT DOCUMENTS

| | | | |
|---|---|---|---|
| 3,012,878 | 12/1961 | Muller | 75/343 |
| 3,880,652 | 4/1975 | Wehn et al. | 75/363 |
| 4,285,724 | 8/1981 | Becker et al. | 75/368 |
| 4,445,931 | 5/1984 | Worthington | 75/343 |
| 4,820,339 | 4/1989 | Bibuvenu et al. | 75/368 |
| 4,897,116 | 1/1990 | Scheel | 75/616 |
| 5,098,471 | 3/1992 | Abodishish et al. | 75/619 |

FOREIGN PATENT DOCUMENTS

| | | | |
|---|---|---|---|
| 236221 | 9/1987 | European Pat. Off. | 75/368 |
| 648633 | 2/1979 | U.S.S.R. | 75/368 |
| 2231883 | 11/1990 | United Kingdom | 75/367 |

OTHER PUBLICATIONS

Hagelston, P. J. et al., "Hafnium Metal–II Reduction of Hafnium Tetrafluoride to Hafnium Metal," U.S. Atomic Energy Commission, Aug. 30, 1950.

Primary Examiner—George Wyszomierski
Attorney, Agent, or Firm—E. Philip Koltos

[57] ABSTRACT

A continuous process for producing a granular metal selected from the group consisting of Ti, Zr or Hf under conditions that provide orderly growth of the metal free of halide inclusions comprising:

a) dissolving a reducing metal selected from the group consisting of Na, Mg, Li or K in their respective halide salts to produce a reducing molten salt stream;
b) preparing a second molten salt stream containing the halide salt of Ti, Zr or Hf;
c) mixing and reacting the two molten streams of steps a) and b) in a continuous stirred tank reactor;
d) wherein steps a) through c) are conducted at a temperature range of from about 800° C. to about 1100° C. so that a weight percent of equilibrium solubility of the reducing metal in its respective halide salt varies from about 1.6 weight percent at about 900° C. to about 14.4 weight percent at about 1062° C.; and wherein a range of concentration of the halide salt of Ti, Zn or Hf in molten halides of Na, Mg, Li or K is from about 1 to about 5 times the concentration of Na, Mg, Li or K;
e) placing the reacted molten stream from step c) in a solid-liquid separator to recover an impure granular metal product by decantation, centrifugation, or filtration; and
f) removing residual halide salt impurity by vacuum evaporator or inert gas sweep at temperatures from about 850° C. to 1000° C. or cooling the impure granular metal product to ambient temperature and water leaching off the residual metal halide salt.

8 Claims, 1 Drawing Sheet

CONTINUOUS PRODUCTION OF GRANULAR OR POWDER TI, ZR AND HF OR THEIR ALLOY PRODUCTS

BACKGROUND OF THE INVENTION

Field of the Invention

The present invention relates to continuous production of granular titanium, zirconium or hafnium metal or their alloys by: dissolving reducing metals such as sodium, magnesium, or lithium in their respective halide salts to produce a reducing molten salt process stream; preparing a second molten salt stream bearing Ti, Zr or Hf in solution; mixing and reacting the two molten salt process streams in a continuous stirred tank reactor where control of the concentrations of reactants, the contacting pattern, and the temperature produce orderly growth of granular metal free of halide inclusions; removing granular metal from the system; and leaching the remaining salts from the granular metal.

Background of the Invention

Titanium and its alloys are used in the construction of parts for aircraft and machines and equipment utilized in the chemical process industries, owing to its high strength and toughness, excellent corrosion resistance, and low density. Zirconium, on the other hand, is used chiefly as a material for constructing nuclear reactors because, in addition to its properties in common with titanium, zirconium is characterized by the property of low neutron absorption. Hafnium is the opposite of zirconium in that it is characterized by the property of large neutron absorption and is used for control rods in nuclear reactors.

In the case of titanium, zirconium and hafnium, current methods for commercially preparing these materials are by reduction with either magnesium metal or sodium metal, and these commercial methods of preparation are costly batch processes. For example, in the case of titanium, the Kroll process entails utilizing a metal retort containing molten magnesium as the reactor into which liquid titanium tetrachloride is introduced. The reaction is sporadic and promotes the growth of dendritic titanium metal which encapsulates some of the molten magnesium chloride salt that is also formed by the reaction. The spongy dendritic titanium metal is then separated from the magnesium chloride and the excess magnesium metal needed for completion of the reaction.

Another process for producing titanium metal is the Hunter process, and this process utilizes a two-stage sodium reduction of titanium tetrachloride. The Hunter process also produces a spongy titanium mass that must be separated from the salt reaction product and the excess reductant metal.

In both the Kroll and Hunter processes for producing titanium metal (or zirconium or hafnium) complete removal of the salt from the titanium is difficult because the rapid and uncontrolled growth of metal during the reduction process encapsulates some of the salt, and these enclosed impurities cause difficulty during subsequent melting and processing operations.

In both prior art processes, the spongy masses of titanium are mechanically reduced in size, compacted into cakes by high-pressure presses, made into consumable electrodes, and are then vacuum-arc melted into ingots. However, during these processing steps, some sponge particles as large as several centimeters in size may be ignited in air and are thereby converted to titanium oxynitride, which is usually not destroyed during the melting operations. The resulting inclusions of hard material within the titanium metal parts have been identified as causing disastrous failures of jet engine parts, and these failures have led to crashes of aircraft.

Further, during forging, rolling, and machining of titanium to produce parts, much titanium is lost. One attempt for increasing the efficiency of titanium use is to produce titanium powder compacts by pressing titanium metal powder into dies under high pressure, and sintering the metal powder in an inert atmosphere to form dense titanium parts. However, this route requires high-purity titanium powder, and high-purity titanium powder is very expensive according to the currently used methods of manufacturing the same.

U.S. Pat. No. 3,875,038 discloses a method of manufacturing titanium metal by contacting two dilute streams of molten salt to produce titanium metal; however, the method of this invention in all of its embodiments reveals that the means of mass transfer of Ti and the reductant metal is by diffusion. This passive diffusion technique deprives the process of deliberate control of the reaction means and this process is encumbered with the inherent disadvantages of the Kroll or Hunter processes in that the titanium-containing chemical intermediate compounds to be reduced are contacted directly with magnesium or sodium metal reductant, where uncontrolled reaction occurs. These very rapid and sporadic reactions cause bursts of metal reduction that inevitably cause inclusion of halide salts within the titanium metal mass in a form that cannot readily be removed without melting the metal. Further, the rapid and uncontrolled growth of titanium metal forms dendritic interlocking masses that are difficult to handle and are not suitable to powder metallurgical applications.

For example, when the dendritic material is broken up for use in consumable electrodes, the spongy particles are relatively large. Moreover, when these spongy particles are accidentally ignited during processing, they form large nitride inclusions which tend not to dissolve during melting and these large nitride inclusions cause deleterious effects on the integrity of the titanium metal.

Therefore, there is a need in the art of producing titanium, zirconium or hafnium to provide an orderly growth of granular titanium, zirconium or hafnium by controlling the rate of particle growth so as to exclude halide salts of these metals, and thereby control particle sizes and particle shapes, to provide the best granular material for various applications, inclusive of vacuum arc melting and powder metallurgy.

Further, there is a need to provide orderly growth of granular metals of titanium, zirconium or hafnium so that the particle sizes of the metals will be small enough so that a single oxidized or nitrided particle will be more likely to dissolve during melting thereby eliminating the problem of nitride inclusions.

SUMMARY OF THE INVENTION

One object of the invention is to provide a method for orderly crystal growth of Ti, Zr, or Hf particles during the process of reduction of the metal.

Another object of the invention is to provide a means for tailoring the size and shape of Ti, Zr, or Hf particles to a particular application.

A yet further object of the invention is to provide a means for achieving orderly crystal growth of titanium by controlling the concentrations of reactants in a continuous stirred tank reactor in a manner such that crystallization will occur on existing surfaces of particles suspended in the halide salt medium, where particle growth occurs.

A still further object of the invention is to provide control of the concentrations of reactants in a molten salt medium within a stirred tank reactor by utilizing the solubility of the metals to be reduced (Ti, Zr or Hf) and the reductant metals in their halide salts or in the halide salts of other metals such as Na, K, Li, or Mg.

In general, in the method of the invention, the concentration of the reductant metal is controlled by dissolving the reductant metal in a recirculating stream of the halide salt medium and reacting this reductant metal-rich stream of halide salt with another stream of halide salt rich in Ti, Zr, or Hf species. These two streams are mixed and reacted in a continuous stirred tank reactor in which the concentrations and contacting patterns are managed so that new titanium metal forms on the surfaces of existing metal particles, thereby causing controlled particle growth. The method of the invention also prevents the uncontrolled nucleation of very fine metal particles that would be difficult to handle.

DETAILED DESCRIPTION OF THE INVENTION

Figure 1:
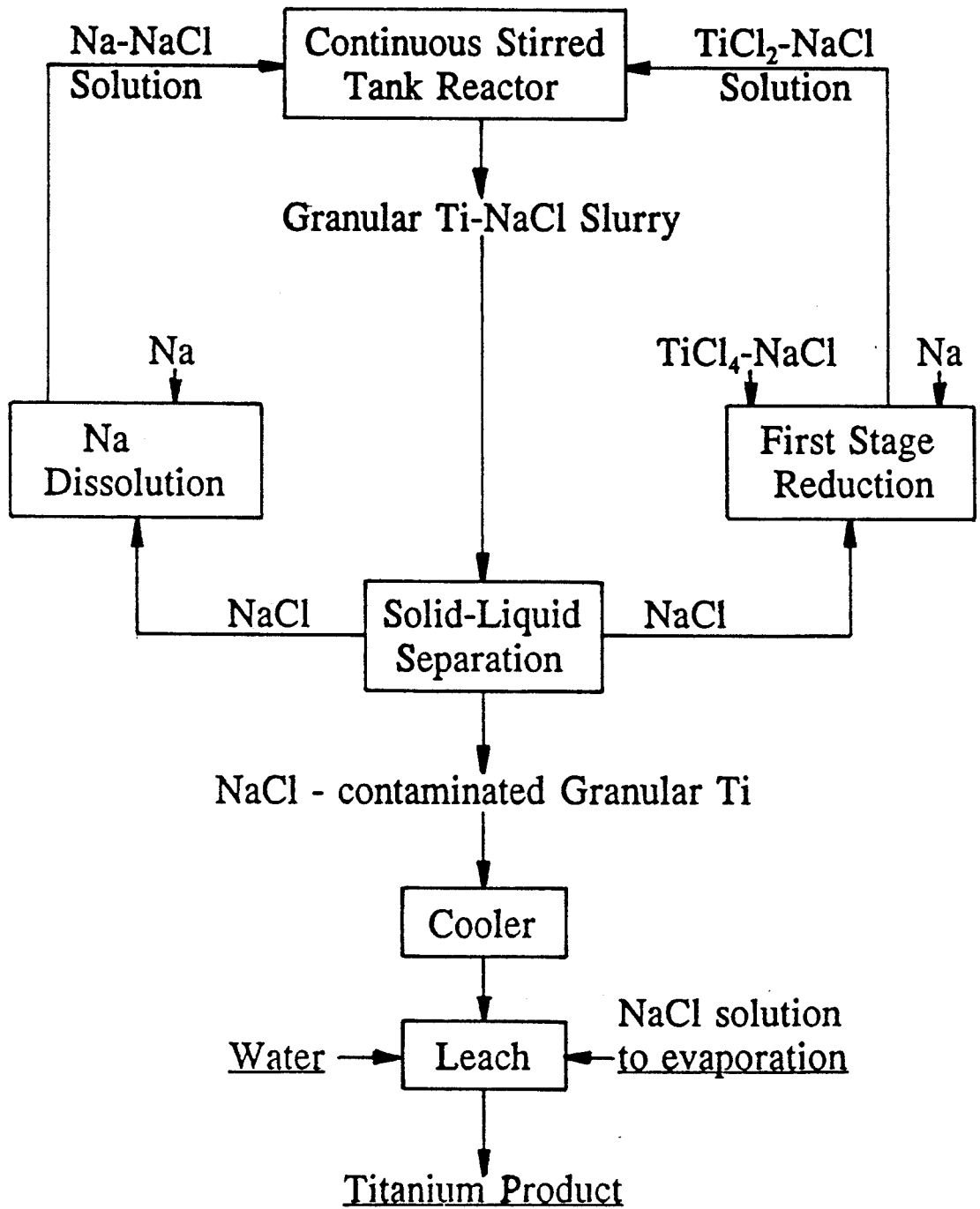
FIG. 1 is a flow diagram of the process of the invention.

It is very well known to molten salt chemists that the complete solubility of some metals in their respective molten salt occurs around the boiling point of the metal, and that below this boiling point or temperature of complete solubility, a liquid immiscibility temperature range exists that may be used to limit the concentration of reductant metal by contacting the reductant metal with the halide salt at a temperature below the temperature of complete solubility, and in this way automatically limiting or controlling the desired level of concentration of the reductant metal in the salt.

However, the present invention continuously manufactures granular titanium, zirconium or hafnium metal by: dissolving a reducing metal such as sodium, potassium, magnesium, or lithium in one of their respective halide salts to produce a reducing molten salt process stream; preparing a second molten salt stream containing the halide salt of titanium, zirconium or hafnium in solution; mixing and reacting the two molten salt process streams in a continuous stirred tank reactor (CSTR) where control of the concentrations of reactants, the contacting pattern, and the temperature produce orderly growth of granular metal free of halide inclusions; removing the granular metal from the system by centrifugation, decantation, or filtration; and separating the remaining salts from the granular metal by inert gas sweep, vacuum evaporation or water leaching.

The method of the invention is continuous and specifically avoids the sporadic and uncontrolled reactions and extreme temperature variances or excursions that would result from directly contacting the reactants as in the case of the Kroll process where $TiCl_4$ directly contacts magnesium metal, or as in the Hunter process where $TiCl_2$ in molten NaCl directly contacts Na metal.

While not wishing to be bound by any theory of the invention, it is nevertheless believed that the invention process achieves orderly crystal growth of titanium particles during reduction of the chloride, by controlling the concentrations of reactants in a continuous stirred tank reactor in a manner such that crystallization occurs on the existing surfaces of particles suspended in the molten halide salt medium, where particle growth occurs.

In the invention process, the concentrations of reactants in the molten salt medium are controlled by the solubility of both the metal halides to be reduced and the reductant metals in their halide salts.

In referring to FIG. 1, which depicts a flow diagram of the process of the invention, and which is given for Na reduction of $TiCl_2$, Na is dissolved in its respective halide salt to produce a reducing molten salt process stream. Thereafter, a second molten salt process stream is prepared containing the halide salt of Ti in solution, whereupon mixing and reacting of the two molten salt process streams is effected in a continuous stirred tank reactor at temperatures between about 800° C. to about 1100° C. However, the preferred temperature in the context of the invention is about 900° C.

The equilibrium solubility of Na in molten NaCl at these temperatures is such that the solubility may vary as follows: 1.6 wt. % at 900° C., 2.2 wt. % at 915° C., 4.2 wt. % at 972° C., 8.9 wt. % at 1036° C. and 14.4 wt. % at 1062° C. On the other hand, the range of concentration of $TiCl_2$ in molten NaCl is about 0.1 to about 5 times the concentration of sodium; however, the preferred concentration is equal to the concentration of sodium. The solubility of reducing metal can be increased linearly at the same temperature, by increasing the atmospheric pressure by 1 unit over and above normal atmospheric pressure; and, this is especially important when the reducing metal is Mg. The increased pressure can range from about 1 to about 5 atmospheres, and it is necessary to maintain these pressures intact up through the mixing and reacting step in the continuous stirred tank reactor.

The granular metal is removed from the molten salt system in a solid-liquid separation device and is then cooled to about ambient temperatures whereupon the remaining salts are separated by water leaching to remove residual sodium chloride, which is recovered by evaporation.

In an alternate embodiment of the process of the invention, a molten salt stream enriched in the reducing metal can also be prepared by partial electrolytic reduction of the salt at a temperature such that the reductant metal co-produced is dissolved in the remaining halide salt. The halide salt enriched in dissolved reductant metal is then recirculated to the reactor.

It is to be appreciated that other reductant metals in their halide salts may also be used in the context of the invention process, and these salts include magnesium (Mg) and magnesium chloride ($MgCl_2$), potassium (K) and potassium chloride (KCl), lithium (Li) and lithium chloride (LiCl) and mixtures of these metals and their halide salts.

It is also to be appreciated that other reductant metal-halide salt systems lend themselves to alternative processing technologies for separating granular Ti, Zr, or Hf metal from the molten salt. These technologies include vacuum evaporation and inert gas sweep at temperatures in the range 850° C. to 1000° C.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A continuous process for producing a granular metal selected from the group consisting of Ti, Zr or Hf under conditions that provide orderly growth of the metal free of halide inclusions comprising:
    a) dissolving a reducing metal selected from the group consisting of Na, Mg, Li or K in their respective halide salts to produce a reducing molten salt stream;
    b) preparing a second molten salt stream containing the halide salt of Ti, Zr or Hf;
    c) mixing and reacting the two molten streams of steps a) and b) in a continuous stirred tank reactor;
    d) wherein steps a) through c) are conducted at a temperature range of from about 800° C. to about 1100° C. so that a weight percent of equilibrium solubility of the reducing metal in its respective halide salt varies from about 1.6 weight percent at about 900° C. to about 14.4 weight percent at about 1062° C.; and wherein a range of concentration of the halide salt of Ti, Zr or Hf in molten halides of Na, Mg, Li or K is from about 0.1 to about 5 times the concentration of Na, Mg, Li or K;
    e) placing the reacted molten streams from step c) in a solid-liquid separator and separating the granular metal product by centrifugation, decantation or filtration; and
    f) cooling said granular metal product to ambient temperature and removing the residual metal halide salts by water leaching.

2. The process of claim 1, wherein Na is the reducing metal and $TiCl_4$ is the halide salt of step b).

3. The process of claim 1, wherein steps a) through c) are conducted at a temperature of about 900° C.

4. The process of claim 1, wherein the reducing metal is Mg.

5. The process of claim 1, wherein the reducing metal is Li.

6. The process of claim 1, wherein the reducing metal is K.

7. The process of claim 1, wherein steps a) through c) are conducted at from about 1 to about 5 atmospheres of pressure.

8. A continuous process for producing a granular metal selected from the group consisting of Ti, Zr or Hf under conditions that provide orderly growth of the metal free of halide inclusions comprising:
    a) dissolving a reducing metal selected from the group consisting of Na, Mg, Li or K in their respective halide salts to produce a reducing molten salt stream;
    b) preparing a second molten salt stream containing the halide salt of Ti, Zr or Hf;
    c) mixing and reacting the two molten streams of steps a) and b) in a continuous stirred tank reactor;
    d) wherein steps a) through c) are conducted at a temperature range of from about 800° C. to about 1100° C. so that a weight percent of equilibrium solubility of the reducing metal in its respective halide salt varies from about 1.6 weight percent at about 900° C. to about 14.4 weight percent at about 1062° C.; and wherein a range of concentration of the halide salt of Ti, Zr or Hf in molten halides of Na, Mg, Li or K is from about 0.1 to about 5 times the concentration of Na, Mg, Li or K;
    e) placing the reacted molten streams from step c) in a solid-liquid separator and separating the granular metal product by centrifugation, decantation or filtration; and
    f) performing vacuum evaporation or inert gas sweep at a temperature from about 850° C. to 1000° C.

* * * * *